(12) United States Patent
Cooper

(10) Patent No.: US 8,164,437 B2
(45) Date of Patent: Apr. 24, 2012

(54) DETECTION APPARATUS

(75) Inventor: Glyn Cooper, Sheffield (GB)

(73) Assignee: Pyronix Limited (GB)

( * ) Notice: Subject to any disclaimer, the term of this patent is extended or adjusted under 35 U.S.C. 154(b) by 1164 days.

(21) Appl. No.: 11/883,500

(22) PCT Filed: Feb. 2, 2006

(86) PCT No.: PCT/GB2006/000353
§ 371 (c)(1),
(2), (4) Date: Nov. 27, 2007

(87) PCT Pub. No.: WO2006/082405
PCT Pub. Date: Aug. 10, 2006

(65) Prior Publication Data
US 2011/0169629 A1  Jul. 14, 2011

Related U.S. Application Data

(60) Provisional application No. 60/649,941, filed on Feb. 4, 2005.

(30) Foreign Application Priority Data

Feb. 2, 2005 (GB) .................................. 0502144.9

(51) Int. Cl.
*G08B 29/00* (2006.01)
(52) U.S. Cl. ........ 340/507; 340/541; 340/552; 340/565; 367/95
(58) Field of Classification Search .................. 340/507, 340/506, 523, 526, 529, 541, 552, 565; 356/27, 356/29; 367/93, 94, 95
See application file for complete search history.

(56) References Cited

U.S. PATENT DOCUMENTS

| | | | |
|---|---|---|---|
| 3,703,718 A | 11/1972 | Berman | |
| 3,725,888 A | 4/1973 | Solomon | |
| 3,958,118 A | 5/1976 | Schwarz | |
| 4,401,976 A | 8/1983 | Stadelmayr | |
| 4,833,450 A * | 5/1989 | Buccola et al. | 340/506 |
| 4,882,567 A * | 11/1989 | Johnson | 340/522 |
| 5,216,410 A * | 6/1993 | Pildner et al. | 340/509 |
| 5,475,365 A * | 12/1995 | Hoseit et al. | 340/522 |
| 6,191,688 B1 | 2/2001 | Sprouse | |
| 6,265,970 B1 | 7/2001 | Whitehead | |

FOREIGN PATENT DOCUMENTS

| | | |
|---|---|---|
| EP | 0337964 | 10/1989 |
| EP | 0373716 | 6/1991 |
| EP | 1335410 | 8/2003 |
| WO | WO-2006/082405 | 8/2006 |

OTHER PUBLICATIONS

International Search Report, corresponding to International Application No. PCT/GB2006/000353, mailed Apr. 11, 2006 (5 Pages).

* cited by examiner

*Primary Examiner* — Toan N Pham
(74) *Attorney, Agent, or Firm* — Wilmer Cutler Pickering Hale & Dorr LLP.

(57) ABSTRACT

Embodiments of the present invention relate to a range reduction detection apparatus that is able to detect blocking of its field of view. Detection of an event, due to movement or intrusion within the field of view, is arranged to start a timer, which will time-out thereby providing an indication of such blocking unless a subsequent event is detected within the time-period.

9 Claims, 5 Drawing Sheets

DETECTION APPARATUS

FIELD OF THE INVENTION

The invention relates to a detection apparatus and, more particularly, to such an apparatus having an anti-blocking capability or a blocking detection capability, that is, a reduced range detection capability.

BACKGROUND TO THE INVENTION

Detection apparatuses, for example, intrusion monitoring apparatuses, are well known within the art. Typically, they are used to detect unauthorised entry or intrusion into a protected volume.

Commercially available intrusion monitoring apparatuses can be either passive or active. Passive intrusion monitoring apparatuses can comprise a sensor that detects infrared radiation emitted by people. Typically, such passive apparatuses comprise a thermal detection apparatus consisting of one or more thermal detectors arranged to detect infrared radiation and an optical system for directing such infrared radiation towards the thermal detection apparatus. Typically, the optical system comprises at least one lens and, more often, a plurality of lenses such as, for example, a plurality of Frensel lenses. Conventionally, the Frensel lenses monitor respective angular sectors of the protected volume. Such apparatuses are activated when a source of infrared radiation passes from one angular sector to the next, that is, infrared radiation is detected in a plurality of angular sectors. Typical prior art intrusion monitoring apparatuses are illustrated in, for example, U.S. Pat. Nos. 3,703,718 and 3,958,118 and UK patent application number 1,335,410, the entire disclosures of which are included herein by reference for all purposes.

Active intrusion monitoring apparatuses are also known which comprise a transmitter and a receiver. The transmitter emits radiation at a defined frequency and the receiver measures the Doppler shift in any reflected signal. Such active monitoring apparatuses can, for example, operate at microwave frequencies using a microwave detection apparatus to detect the reflected signal.

The above active and passive detection apparatuses can be used alone or in conjunction with one another. Apparatuses that use two or more technologies, that is, a passive detection technology and an active detection technology, to identify intrusion into a protected volume or, more particularly, movement of an intruder within the field of view of the apparatus, are known within the art as combined technology apparatuses, dual technology or multi-technology devices. Examples of combined technology apparatuses that use a photoelectric sensor and a microwave sensor are disclosed in U.S. Pat. Nos. 3,725,888 and 4,401,976, the entire disclosures of which are incorporated herein for all purposes by reference.

In a typical combined technology apparatus the outputs of two independent sensing means, that is, the photoelectric sensor and the microwave sensor, responding to different stimuli, must be present within a predetermined period of time to register an event, that is, intrusion by an intruder into the field of view or fields of view of the combined technology apparatus.

The European Committee for Electrotechnical Standardisation is responsible, amongst other things, for establishing technical standards relating to intrusion detection or detection apparatuses. For example, technical specification CLC/TS 50131-2-4:2004, entitled "*Alarm systems—Intrusion Part 2-3: Requirements for combined passive infrared and microwave detectors*", establishes a base or minimum set of standards or tests to be achieved by microwave detectors. The microwave detectors are given a corresponding grade according to the number or level of tests they pass, that is, according to the degree to which they correspond to the technical specifications or the specifications established by the class of 50131 standards. The above technical specifications are incorporated, for all purposes, herein by reference. The technical specifications provide for a number of security grades; namely, security grades 1 to 4. A requirement of EN 50131-1:1997 is that grade 3 and 4 systems shall have detectors that are able to detect a significant reduction in range. It will be appreciated that EN 50131-2-4:2004 applies to grade 4 detectors only. A simulated walk test is used to determine whether or not a detector is worthy of a corresponding grade. Typically, when assessing detector performance, a detector should generate an intrusion signal or message when an SWT or simulated walk test target moves within and across the detector's claimed boundary of detection for a distance of 3 meters. The detector shall also generate an intrusion signal or message when the standard or simulated walk test target moves at velocities and attitudes that meet the requirements specified of the technical standard CLC/TS 50131-2-4:2004. It can be appreciated from section 4.2.3 of that standard that the requirement headed "Significant reduction of specified range" is such that grade 4 detectors should be capable of detecting "a range reduction along [a] principal axis of detection of more than 50% within a maximum period of 180 s according to the requirements of Table 2". It will be appreciated that range reduction is discussed with reference to figure C.5 of that standard. Furthermore, it is indicated that the requirements of 4.3.5 (self test) and 4.5.5 (resistance to masking) can provide range reduction detection. Section 6.4.5, entitled "Verify the significant reduction of specified range" specifies a test to be met in determining whether or not a detector can detect a significant reduction of a specified range according to the technical specification. The test is as follows. A test point on a detector axis at a distance of 55% of the manufacturer's claimed detection range is selected. A barrier of cardboard boxes is erected across the axis such that it is normal, that is, perpendicular, to it at a distance of 45% of the manufacturer's claimed detection range. The barrier is such that it covers a horizontal distance of plus and minus 2.5 metres either side of the axis and has a vertical height of 3 metres such as is shown in figure C.5 of the technical specification CLC/TS 50131-2-4-2004. At the test point, two test directions are used, beginning at a distance of 1.5 metres before the test point, and finishing 1.5 metres after it, moving perpendicularly to the detector axis. The SWT shall move along each path from start to finish. At the end of each walk test, the SWT shall pause for at least 20 seconds before carrying out any further tests. The pass/fail criterion is such that an alarm or fault signal or message is generated when the barrier is present. It will be appreciated that a corresponding standard also prescribes requirements for passive infrared detectors; namely, DD CLC/TS 50131-2-2:2004.

Manufacturers within the industry, thus far, have been unable to produce an effective means of meeting the test established by 6.4.5 of the technical specification(s).

It is an object of embodiments of the present invention to at least mitigate one or more of the problems of the prior art.

SUMMARY OF INVENTION

Embodiments provide a range reduction or blocking detection apparatus for detecting comprising means, responsive to at least a first input signal, to generate a range reduction or blocking detection alarm signal, providing an indication that the field of view of the detector has been reduced or obscured by an object within the field of view relative to a specified performance characteristic, after a first period of time, measured relative to the first input signal, unless a second input signal is received within that first period of time.

Preferably, embodiments provide an apparatus in which the means to generate the alarm signal comprises a timer arranged to time out after the first period of time and to generate, or cause to be generated, the range reduction detection alarm signal and means to detect input of the second input signal to at least stop or reset the timer.

Embodiments provide an apparatus as claimed in either of claims 1 and 2 in which the first and second input signals have the same type. Alternatively, embodiments provide an apparatus in which the first and second signals have different types. In preferred embodiments, the first and second signals are derived from at least one of a microwave sensor or an infrared sensor such as a passive infrared sensor or an active infrared sensor. Accordingly, preferred embodiments provide an apparatus further comprising at least one of a microwave sensor and a passive infrared sensor. However, embodiment could be realised with other types of sensor.

Preferred embodiments provide an apparatus further comprising an alarm to generate an alarm output in response to the range reduction or blocking detection signal.

Embodiments provide an intrusion monitoring apparatus comprising at a detector arranged to generate at least a first signal indicating detection of the presence of an object within an associated field of view; the apparatus comprising a range reduction or blocking detection as claimed in any preceding claim for processing the first signal and determining whether or not the detector generates a second signal within a predetermined period of time of the first signal and generate a reduction range or blocking detection signal indicative of an object having been placed within the associated field of view thereby obscuring part of that field of view.

Embodiments provide an intrusion detection apparatus that is able to detect blocking of its field of view by an object placed within that field of view; the apparatus comprising means, responsive to detecting an event, due to movement or intrusion within the field of view, to start a timer, which will time-out after a predetermined time period thereby providing an indication of such blocking unless a subsequent event is detected within the predetermined time period.

Embodiments provide an anti-blocking method; comprising the steps of detecting an event within a protected volume of an intrusion monitoring arrangement; starting a timer in response to said detecting and generating an alarm signal within a predetermined period of time of starting the timer unless a subsequent event is detected within the protected volume.

Advantageously, blocking detection can be realised, that is, a security system can be realised that can detect when the fields of view of the detectors of the system are obscured.

BRIEF DESCRIPTION OF THE DRAWINGS

Embodiments of the present invention will now be described, by way of example only, with reference to the accompanying drawings in which.

DESCRIPTION OF THE PREFERRED EMBODIMENTS

Figure 1:
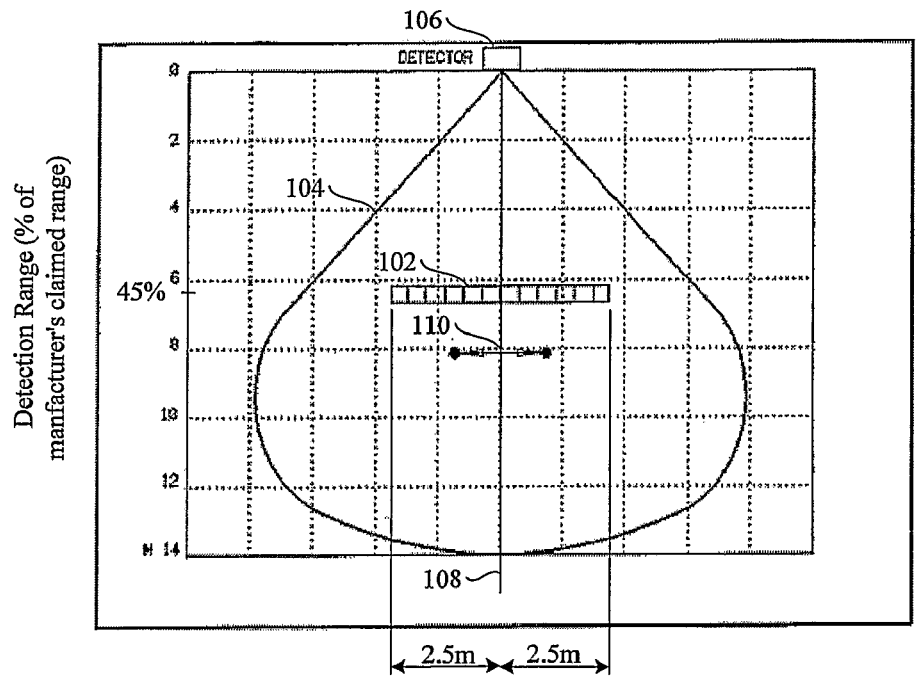
FIG. 1 illustrates the arrangement for satisfying the significant range reduction test described above.

FIG. 1 illustrates a test arrangement 100 for verifying a significant reduction of a specified range as prescribed by 6.4.5 of CLC/TS 50131-2-4 or 2:2004. It can be appreciated that a barrier of cardboard boxes 102 is erected within the field of view 104 of the detector 106. It can be appreciated that the cardboard boxes 102a form a barrier across a detector axis 108 at a distance of 45% of the manufacturer's claimed detection range. The barrier of cardboard boxes 102 covers a horizontal distance of 2.5 metres either side of the detector axis 108 and has a vertical height of 3 metres. It can be appreciated that a test point 110 is positioned at a distance of 55% of the manufacturer's claimed detection range. Two test directions are used, which begin at a distance of 1.5 metres before the test point and finishing 1.5 metres after it and are perpendicular to the detector axis 108.

It can be appreciated that the blocking or range reduction depicted with reference FIG. 1 and which is detected by embodiments of the present invention, arises due an object obscuring the field of view due to that object being placed within the field of view. Within the present specification it will be appreciated that the term field of view constitutes a protected or surveyed volume that is monitored by the detector. The performance characteristic of the detector that is reduced or changed is its range, that is, its range is reduced relative to the manufacturer's specified range. Alternatively, the performance characteristic might not be the manufacturer's specified range, which is usually a maximum range, but it might be the range of the detector as installed. This follows from some detectors being programmable such that the range can be set by hardware, software or a combination thereof.

It can be appreciated that blocking the field of view can be distinguished from preventing the formation of the field of view, which is known within the art as masking. Masking results from tampering or interference with the detector itself to prevent the detector from being able to "see" the protected volume, that is, the detector is blinded or masked. This can be contrasted with blocking or range reduction in which the detector has a field of view, but which is curtailed in some way. With masking the field of view is prevented from being formed whereas with blocking or range reduction that field of view is formed but it is obscured in some manner.

Figure 2:
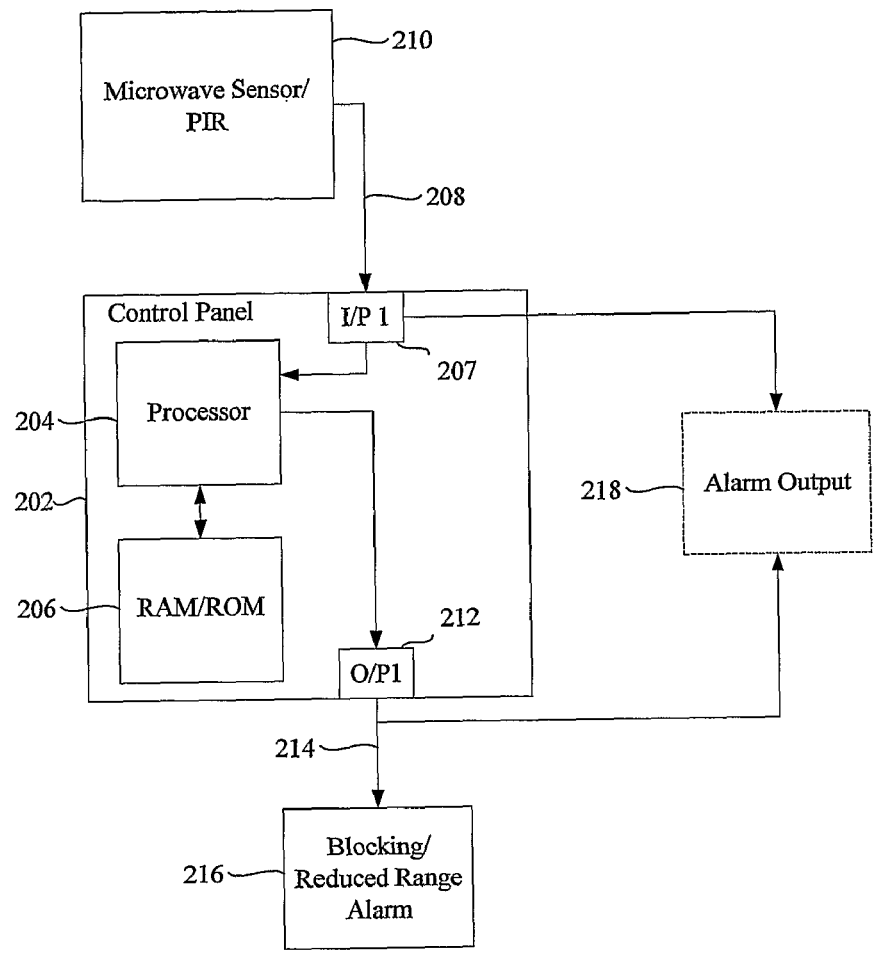
FIG. 2 shows a range reduction detection apparatus according to a first embodiment.

FIG. 2 shows, schematically, a range reduction detector system 200 according to a first embodiment. The detector system 200 comprises a control panel 202 having a processor 204 and ROM and RAM 206, which cooperate together to run software (not shown) for implementing the first embodiment of the present invention. The control panel 202 comprises a first input port 207 for receiving a signal 208 from a detector 210. The detector 210 can be a microwave detector or a PIR detector. The control panel 202 also comprises an output port 212 for outputting a signal 214 to a first alarm 216 that provides an indication that a reduction in detection range has been detected.

Optionally, the signal 214 output by the first output port 212 can also be processed by a second alarm 218 that is used to provide an indication that movement has been detected within the field of view of the detector 210. In preferred embodiments, a control panel for setting or unsetting an alarm is arranged such that an alarm cannot be set when blocking, that is, range reduction, has been detected. Conventionally, setting an alarm takes place via a control planel (not shown). The control panel may provide some indication that the alarm cannot be set due to blocking having been detected. Also, one skilled in the art will appreciate that the signals supplied to, and output from, the control panel 202 might be wireless signals or wired signals, that is, signals conveyed using wires.

Figure 3:
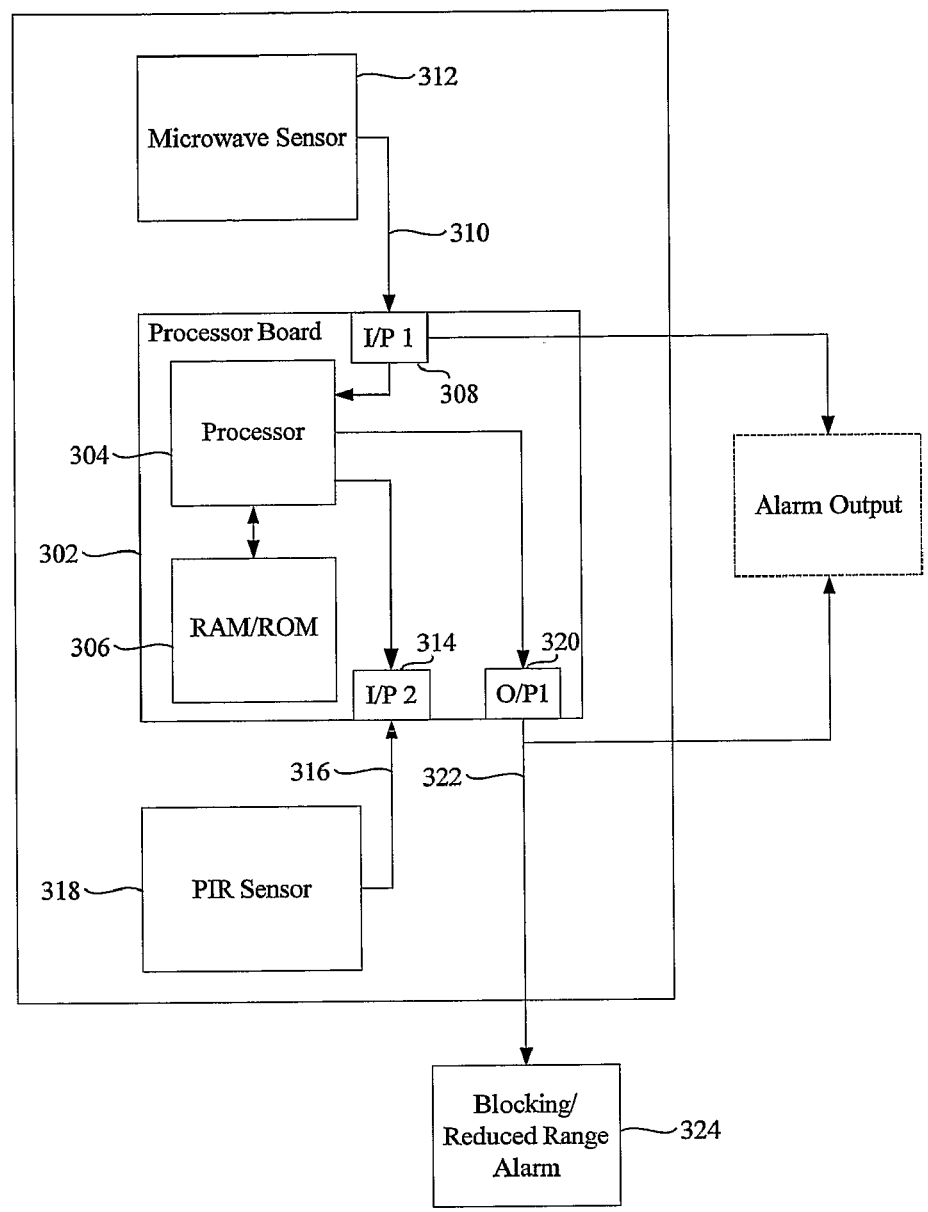
FIG. 3 depicts a range reduction detection apparatus according to a second embodiment.

FIG. 3 shows a second embodiment of a range reduction detector system 300. The detector system 300 comprises a control panel 302 having a processor 304 and ROM and RAM 306, which cooperate together to control the operation of the detector system 300. The control panel 302 comprises a first input port 308 for receiving a signal 310 from a microwave sensor 312. The control panel 302 also comprises a second input port 314 for receiving a signal 316 from a passive infrared sensor 318. A first output port 320 is used to provide an output signal 322 to a first alarm 324. The first alarm 324 provides an indication that a reduction in the detector range has been detected, that is, an obstruction has been erected or placed within the field of view of the detector such that a portion of the protected volume to be monitored is obscured from view.

One skilled in the art will appreciate that the microwave sensor 312 and the PIR sensor 318 will typically be housed within a common detector housing and together constitute a detector having a field of view. The field of view of such a combined technology or dual technology detector, that is, a multiple technology detector, is determined by the extent to which the field of view of the microwave sensor 312 and the field of view of the PIR sensor 318 overlap in an operable sense, that is, overlap so that the two technologies cooperate. Preferably, the two technologies cooperate in such a manner that detection of movement within the common or overlapped portion of the field of view of the microwave sensor 312 or the PIR sensor 318 is confirmed by the other sensor.

Figure 4:
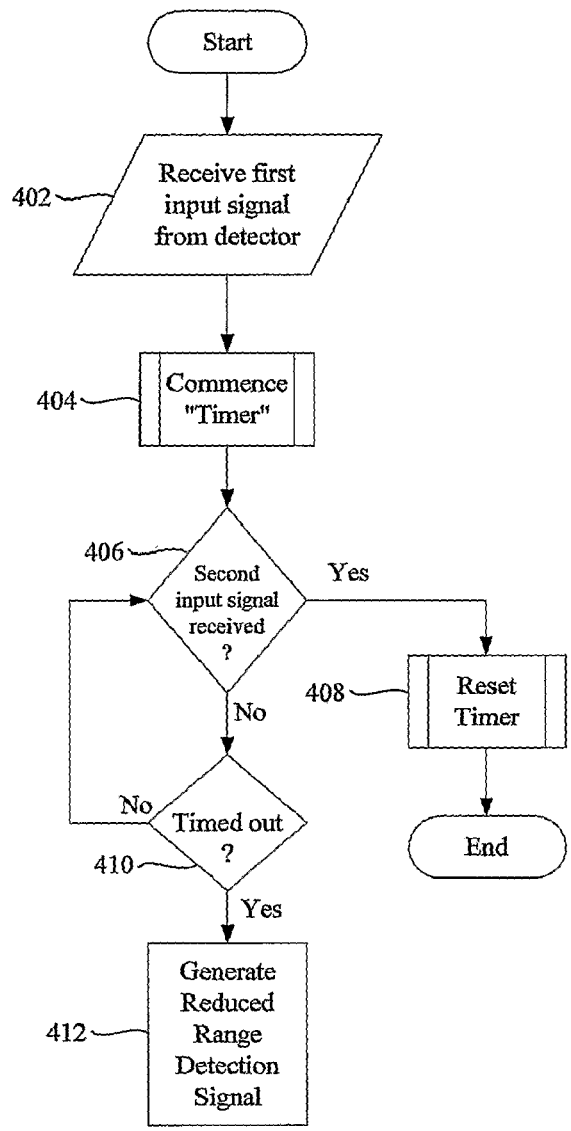
FIG. 4 illustrates a flow chart for software according to an embodiment.

FIG. 4 shows a flowchart 400 implemented by the above-mentioned software executed by processors 204 or 304. A first input signal is received by the control panel 202 or 302 from a corresponding detector at step 402. Receipt of the first input signal starts a timer (not shown) at step 404. Embodiments can be realised such that either (a) the timer is commenced in response to the first input signal exceeding a threshold a predetermined number of times within the first time period or (b) the first signal breaches the threshold for a cumulative percentage of time during the first time period, which may a single threshold crossing or multiple threshold crossings. The timer is used to establish a period of time during which the software is arranged to detect or process the second input signal from the, or a, detector. Therefore, a determination is made, at step 406, as to whether or not such a second input signal has been received. If it is determined that such a second input signal has been received, the timer is reset at step 408. However, if it is determined at step 406 that a second input signal has not been received, a determination is made at step 410 as to whether or not the timer commenced at step 404 has timed out. If the determination at step 410 is that the timer has not timed out, processing returns to step 406. However, if the determination at step 410 is that the timer has timed out, the signal 214 or 322 providing an indication of range reduction detection is output via an output port 212 or 320 to a respective alarm 216 or 324.

In so far as the above described flowchart relates to the first detector system 200 described by in relation to FIG. 2, it will be appreciated that the first and second input signals will be derived from the same sensor. If the sensor 210 in the detector system 200 is a microwave sensor, then the first and second input signals will relate to detection of movement within a respective protected volume 104 by the microwave sensor, that is, both the first and second input signals will be of a first type. However, if the sensor 210 is a PIR sensor, the first and second input signals will relate to detection of movement within the field of view of the PIR. sensor, that is, both the first and second input signals will be of a second type.

In so far as the above described flowchart 400 relates to the second detector system 300 described in relation to FIG. 3, it will be appreciated that the first and second input signals will be derived from at least one of either the microwave sensor 312 and the PIR sensor 318 respectively or the PIR sensor 318 and the microwave sensor 312 respectively. However, one skilled in the art will also appreciate that the first and second input signals could both be derived from either the microwave sensor 312 or the PIR sensor 318 in a manner substantially similar to that of the first detector system 200.

The above described embodiments make reference to starting and stopping a timer. One skilled in the art appreciates that such a timer can be implemented in a number of ways. For example, the timer can be implemented using a counter that is fed by, or is arranged to count pulses of, an oscillator. The counter can be an up or down counter that, upon reaching a preset value, generates a signal marking the end of a preset period of time and represents the reduced range detection signal or is used to generate the reduced range detection signal. If the counter is a counter down counter, it will be initialised with an appropriate value corresponding to a preset period of time when driven by an oscillator having a known time period. Alternatively, the value of a clock, which may form part of the microprocessor which may, itself, be implemented in the form of a timer, can be recorded in response to receipt of the first input signal. The clock can be repeatedly interrogated at step 410 to note the current time or, more accurately, the current count, which can then be used to determine the elapsed time since the clock was first interrogated or started. Still further, the starting and stopping or resetting of a timer or recording points in time can be interrupt driven, that is, the first and second input signals operate as interrupts from a processor's perspective.

It will be appreciated that the above detector systems 200 or 300 are able to meet the test set out in 6.4.5 of CLC/TS 50131-2-4:2004 since, for example, a person performing the SWT at the test point will be detected by the microwave sensor 312, which will start the timer, but will not be detected by the PIR sensor 318. Therefore, the PIR signal 316, that is, the second input signal, will not be received and will not reset or stop the timer. Hence, the timer will time out, that is, a preset period of time, measured from receipt of the first input signal, will elapse, which will, in turn, generate, or cause to be generated, the reduced range detection signal. The reduced range detection signal such as, for example, output signals 214 or 322, are used to drive the reduced range detection alarms 216 and 324.

Figure 5:
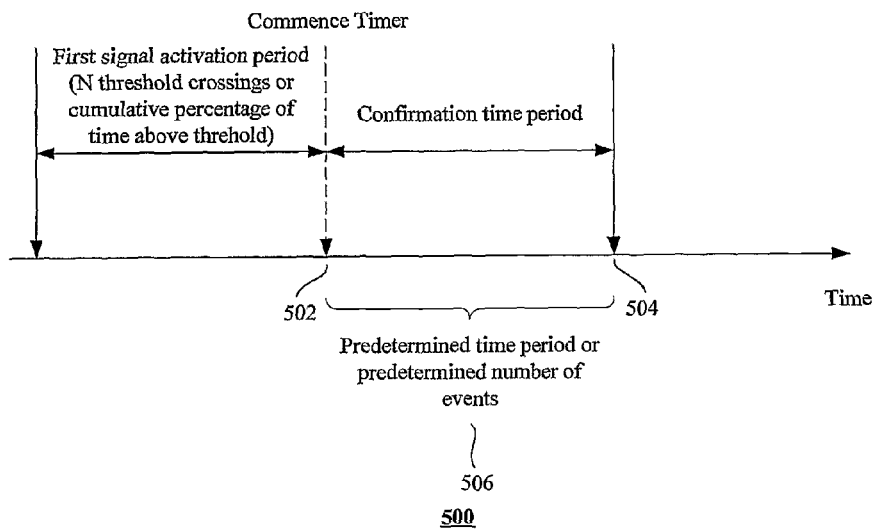
FIG. 5 depicts a timing diagram according to an embodiment.

FIG. 5 shows a timing diagram 500 comprising a first point in time 502 at which the timer is commenced in response to receipt of the first input signal and a second point in time 504, which marks the end of the above described preset period of time 506. As indicated above, embodiments can be realised such that either (a) the timer is commenced in response to the first input signal exceeding a threshold a predetermined number of times within the first time period or (b) the first signal breaches the threshold for a cumulative percentage of time during the first time period, which may a single threshold crossing or multiple threshold crossings. If the first and second input signals are received during the preset period of time, the timer is reset. If the first and second input signals are not received during the preset period of time, the reduced range detection signal is generated at or after the second point in time 504. Although this embodiment has been described with reference to the timer being reset only by the subsequent detection of both the first signal and the second signal, embodiments can be realised in which the timer is reset by receiving only the second signal during the time period.

Figure 6:
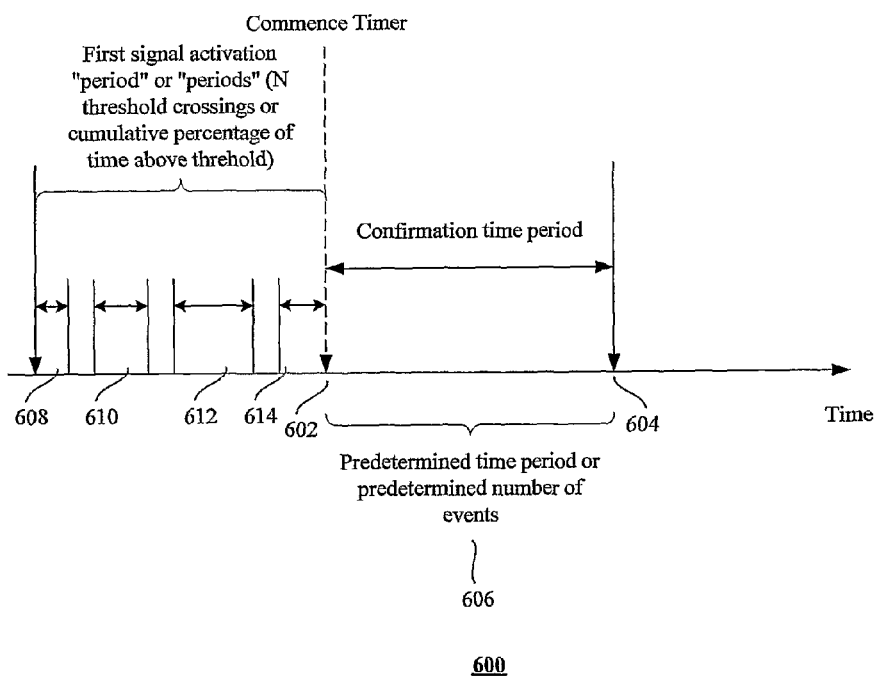
FIG. 6 shows a further timing diagram according to an embodiment.

Embodiments can be realised in which the preset period of time is, for example, a maximum of 180 seconds. Alternative embodiments can be realised in which the preset period of time is 15 seconds. Also, the first and second periods of time might be unequal rather than being substantially equal as depicted in FIG. 5. Still further, the time period can be programmable or different such that different detectors have respective periods of time, that is, different values for the number of threshold crossings to start the timer or different percentages cumulative time above a threshold according to the needs of an installer or user. Preferably, any such programmability would be achieved using switch settings within the detector. Also, although the above embodiments have been described with reference to a single time period during which timer activations are noted, embodiments are not limited to such an arrangement. Embodiments can be realised in which the determination as to whether or not to commence the timer is based on a first signal activity over a number of time periods, which might be contiguous or non-contiguous, or have the same or different, fixed or varying, durations, with the number of threshold crossings or the percentage of time that the threshold has been exceeded being derived from the, or selected ones of the, number of time periods. Referring to FIG. 6, there is shown a timing diagram 600 for such an embodiment. In addition to a confirmation time period between the point in time 602 at which the timer is commenced and the time out period 604, which represents an embodiment of a predetermined time period 606, it can be appreciated that the "time period" over which activity relating the microwave detector must be detected to start the timer comprises a number of time periods 608 to 614. It can be appreciated that the time periods 608 to 614 have different durations. They might also be variable. The time periods 608 to 614 might also be separated by different and/or varying time periods, even though the illustrated embodiment shows equal separation time periods.

It will be appreciated that embodiments of the present invention can be realised using hardware, software or a combination of hardware and software. Embodiments can be realised in which software for implementing embodiments of the present invention can be stored in some form of machine readable storage such as, for example, a ROM, PROM, or other non-volatile device like a programmable gate array and any other device.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings) and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A range reduction detection apparatus comprising means, responsive to at least a first input signal, to generate a blocking alarm signal, providing an indication that a field of view of a detector has been blocked, after a first period of time, unless a second input signal is generated within that first period of time, said blocking being associated with a reduction in detection range of the detector determined relative to a specified detection range of the detector.

2. The apparatus as claimed in claim 1 in which the means to generate the alarm signal comprises a timer arranged to time out after the first period of time and to generate, or cause to be generated, the blocking alarm signal and means to detect input of the second input signal to at least stop or reset the timer.

3. The apparatus as claimed in claim 1 in which the first and second input signals have the same type.

4. The apparatus as claimed in claim 1 in which the first and second input signals have different types.

5. The apparatus as claimed in claim 1 in which:
   (a) the first input signal is derived from a microwave detector or the first input signal is derived from a passive infrared detector;
   (b) the second input signal is derived from a microwave detector or the second input signal is derived from a passive infrared detector;
   (c) the first input signal is derived from a microwave detector and the second input signal is derived from a passive infrared detector; or
   (d) the first input signal is derived from a passive infrared detector and the second input signal is derived from a microwave detector.

6. The apparatus as claimed in claim 1 further comprising at least one of a microwave detector and a passive infrared detector for producing at least one of the first input signal and the second input signal.

7. The apparatus as claimed in claim 1 further comprising an alarm to generate an alarm output in response to the range reduction detection alarm signal.

8. The apparatus as claimed in claim 1 wherein the first period of time is started by at least one of:
   in response to the first input signal exceeding a threshold a predetermined number of times in a predetermined time period, or
   in response to the first signal breaching a threshold for a cumulative percentage of time during a predetermined time period.

9. A non-transitory machine-readable storage storing a program comprising code for causing an apparatus to operate as a range reduction detection apparatus comprising means, responsive to at least a first input signal, to generate a blocking alarm signal, providing an indication that a field of view of a detector has been blocked, after a first period of time unless a second input signal is generated within that first period of time; said blocking being associated with a reduction in detection range of the detector determined relative to a specified detection range of the detector.

* * * * *